(12) United States Patent
Henon et al.

(10) Patent No.: US 11,498,413 B2
(45) Date of Patent: Nov. 15, 2022

(54) DEVICE FOR REGULATING AN AIR STREAM FOR AN AIR INLET OF A MOTOR VEHICLE

(71) Applicant: Valeo Systemes Thermiques, Le Mesnil-Saint-Denis (FR)

(72) Inventors: Emmanuel Henon, Le Mesnil Saint Denis (FR); Benjamin Ferlay, Unterfoehring (DE); Michael Genger, Bad Rodach (DE)

(73) Assignee: Valeo Systemes Thermiques, Le Mesnil-Saint-Denis (FR)

( * ) Notice: Subject to any disclaimer, the term of this patent is extended or adjusted under 35 U.S.C. 154(b) by 114 days.

(21) Appl. No.: 17/040,792

(22) PCT Filed: Mar. 26, 2019

(86) PCT No.: PCT/HR2019/050675
§ 371 (c)(1),
(2) Date: Sep. 23, 2020

(87) PCT Pub. No.: WO2019/186044
PCT Pub. Date: Oct. 3, 2019

(65) Prior Publication Data
US 2021/0001715 A1     Jan. 7, 2021

(30) Foreign Application Priority Data
Mar. 30, 2018    (FR) ........................................ 1852846

(51) Int. Cl.
*B60K 11/00*     (2006.01)
*B60K 11/08*     (2006.01)
(Continued)

(52) U.S. Cl.
CPC ............. *B60K 11/085* (2013.01); *B60K 11/04* (2013.01); *B60K 11/06* (2013.01); *B60Y 2306/09* (2013.01)

(58) Field of Classification Search
CPC ........ B60K 11/085; B60K 11/04; B60K 11/06
(Continued)

(56) References Cited

U.S. PATENT DOCUMENTS 3,857,453 A     12/1974   Buttke et al.
4,164,262 A *   8/1979   Skatsche ................ B60K 11/04
                                                                 180/69.1

(Continued)

FOREIGN PATENT DOCUMENTS

DE        2554752 A1    6/1977
EP         0982168 A1    3/2000
(Continued)

OTHER PUBLICATIONS

International Search Report and Written Opinion in corresponding International Application No. PCT/FR2019/050675, dated Jul. 18, 2019 (16 pages).

*Primary Examiner* — Hau V Phan
(74) *Attorney, Agent, or Firm* — Osha Bergman Watanabe & Burton LLP

(57) ABSTRACT

A device for regulating an air stream for an air inlet of a motor vehicle may include a duct defining a flow channel in which an air stream flows. A cooling unit is arranged in the duct and includes at least one heat exchanger and a motor-fan unit. Additionally, the duct includes at least one sound absorption means arranged so that it at least partially limits the propagation of noise annoyance to the outside of the duct. A motor vehicle may include the regulation device.

10 Claims, 4 Drawing Sheets

(51) Int. Cl.
 B60K 11/04 (2006.01)
 B60K 11/06 (2006.01)
(58) Field of Classification Search
 USPC .......................................................... 180/68.1
 See application file for complete search history.

(56) References Cited

U.S. PATENT DOCUMENTS

| | | | | |
|---|---|---|---|---|
| 4,341,277 | A * | 7/1982 | Adamson | B60K 11/08 180/68.1 |
| 5,778,081 | A | 7/1998 | Patrick | |
| 7,758,828 | B2 * | 7/2010 | Spink | B01D 45/12 34/79 |
| 7,918,313 | B2 * | 4/2011 | Gross | D04H 1/5418 181/294 |
| 8,479,853 | B2 * | 7/2013 | Verbrugge | F01P 11/10 180/68.2 |
| 8,939,121 | B2 * | 1/2015 | Nishiyuki | F23Q 7/001 123/145 A |
| 9,469,187 | B1 * | 10/2016 | Ho | B60H 1/3227 |
| 9,744,848 | B2 * | 8/2017 | Ho | B60K 11/085 |
| 2008/0017318 | A1 * | 1/2008 | Kobayashi | H01J 37/32678 156/345.46 |
| 2011/0284298 | A1 * | 11/2011 | Ajisaka | B60H 1/00542 180/65.21 |
| 2012/0048631 | A1 | 3/2012 | Shatters et al. | |
| 2012/0284448 | A1 * | 11/2012 | Ayzenfeld | G06F 9/48 710/313 |
| 2013/0059519 | A1 * | 3/2013 | Tajima | B60K 11/04 454/152 |
| 2013/0081887 | A1 * | 4/2013 | Tsuchihashi | E02F 9/0866 180/68.1 |
| 2013/0081888 | A1 * | 4/2013 | Charnesky | B60K 11/08 180/68.3 |
| 2013/0133963 | A1 * | 5/2013 | Ajisaka | B60K 11/04 180/68.1 |
| 2013/0240284 | A1 * | 9/2013 | Ajisaka | F01N 5/02 180/309 |
| 2014/0138077 | A1 * | 5/2014 | Ajisaka | B60K 11/04 165/41 |
| 2014/0251241 | A1 * | 9/2014 | Tajima | F01P 11/10 123/41.56 |
| 2014/0299396 | A1 * | 10/2014 | Tajima | B62D 35/02 180/68.1 |
| 2016/0096424 | A1 | 4/2016 | Schiller et al. | |
| 2017/0101140 | A1 * | 4/2017 | Parry-Williams | B62D 35/005 |

FOREIGN PATENT DOCUMENTS

| | | |
|---|---|---|
| EP | 1635049 A1 | 3/2006 |
| EP | 1947250 A2 | 7/2008 |
| EP | 2365139 A1 | 9/2011 |
| EP | 2402574 A1 | 1/2012 |
| FR | 2613771 A1 | 10/1988 |

\* cited by examiner

DEVICE FOR REGULATING AN AIR STREAM FOR AN AIR INLET OF A MOTOR VEHICLE

FIELD OF DISCLOSURE

The invention relates to a device for regulating an air stream for an air inlet of a motor vehicle and more specifically as well as to a motor vehicle, and in particular an electric motor vehicle comprising such an air inlet regulation device.

BACKGROUND

Generally, a motor vehicle comprises an air inlet that takes the form of an opening situated on the front face of said motor vehicle. The incoming air is used to enable a heat exchange between it and the cooling system of the motor vehicle, said cooling system being situated near the front face of said vehicle. More specifically, the air that enters the engine compartment of the motor vehicle is guided to the cooling system of said motor vehicle to enable a heat exchange between the incoming air and the heat exchanger of the cooling system. It is important to minimize the losses of the air stream between the air inlet and the heat exchanger. Any air stream entering the inside of the vehicle, and escaping to the engine compartment before it has contributed to the heat exchange inside the motor vehicle, has a negative influence on the air resistance coefficient of said motor vehicle.

It is known practice to use air guides that take the form of a duct generally made from plastic or another flexible material connecting the air inlet to the cooling system.

In the context of an electric vehicle, the air inlet regulation device can comprise an air duct arranged downstream of the cooling system and designed to guide the air stream to the outside of the vehicle. Such a duct can be advantageous for generating a Venturi effect downstream of the cooling unit so that a greater air flow rate can pass through the cooling system, thus improving the thermal efficiency.

Such a duct does however have certain drawbacks. When an electric vehicle is stationary and connected to a station, or electric terminal, in order to charge the battery, the motor-fan unit of the cooling system is activated in order to cool the battery and prevent it from overheating. However, such operation generates noise annoyance for the user.

SUMMARY OF DISCLOSURE

The present invention seeks to overcome this drawback and proposes a device for regulating an air stream for an air inlet of a motor vehicle, comprising a duct defining a flow channel in which an air stream flows, in which a cooling unit is arranged comprising at least one heat exchanger and a motor-fan unit. According to the invention, the duct comprises at least one sound absorption means arranged so that it at least partially limits the propagation of noise annoyance to the outside of the duct.

The flap makes it possible to shut off the flow channel and in particular the duct conveying the air stream to the outside of the vehicle. The noise annoyance thus generated during battery charging is contained inside the vehicle and can no longer be heard outside the vehicle.

Other embodiments of the air inlet regulation device taken individually or in combination propose that:

the regulation device comprises a flap arranged within the flow channel downstream of the cooling unit relative to the flow of the air stream;

the flap is of the drum or sliding type;

the flow channel comprises an inlet and an outlet, said outlet being made up of at least two separate ducts, the flap being capable of shutting off each of said ducts;

a shut-off device comprising a set of shut-off flaps capable of pivoting rotatably so that they vary the flow rate of the air stream, is arranged in the flow channel upstream of the cooling unit relative to the flow of the air stream;

the cooling unit is inclined relative to the shut-off device;

fins are arranged upstream and/or downstream of the cooling unit relative to the flow of the air stream;

the fins extend from the shut-off device to the cooling unit;

the flow area of the flow channel widens from the inlet to the cooling unit and narrows from the cooling unit to the outlet;

the sound absorption means are arranged downstream of the cooling unit relative to the flow of the air stream;

the sound absorption means are arranged upstream of the cooling unit relative to the flow of the air stream;

the sound absorption means are arranged upstream and downstream of the cooling unit relative to the flow of the air stream;

the sound absorption means comprise a coating made from a woven or non-woven material consisting of different fibers or a foam;

the duct comprises one or more cavities acting as a Helmholtz resonator;

obstacles to the flow of the air stream are arranged within the duct;

the obstacles comprise walls with micro-perforations and/or walls made from a soundproofing material such as polyester and/or beams extending over the width of the duct;

the duct is made from a sound absorbing material such as polyester, rock wool or any other polymer having glass fibers or hemp fibers;

an acoustic labyrinth is arranged within the duct;

the sound absorption means are an active noise control system.

The invention also relates to a vehicle comprising such a device for regulating an air stream for an air inlet according to the invention.

Other embodiments of the vehicle taken individually or in combination propose that:

the vehicle comprises an air inlet, optionally provided with a grille, the outlet of the flow channel comprises a discharge duct arranged to convey the air stream to the outside of the vehicle and a cooling duct arranged to convey the air stream to the engine compartment of the vehicle;

the vehicle further comprises an additional air inlet and an additional duct connecting said additional inlet to the discharge duct.

BRIEF DESCRIPTION OF DRAWINGS

Other features and advantages of the invention will become apparent on reading the following description. This is purely illustrative and should be read in conjunction with the appended drawings, in which.

DETAILED DESCRIPTION

Figure 1:
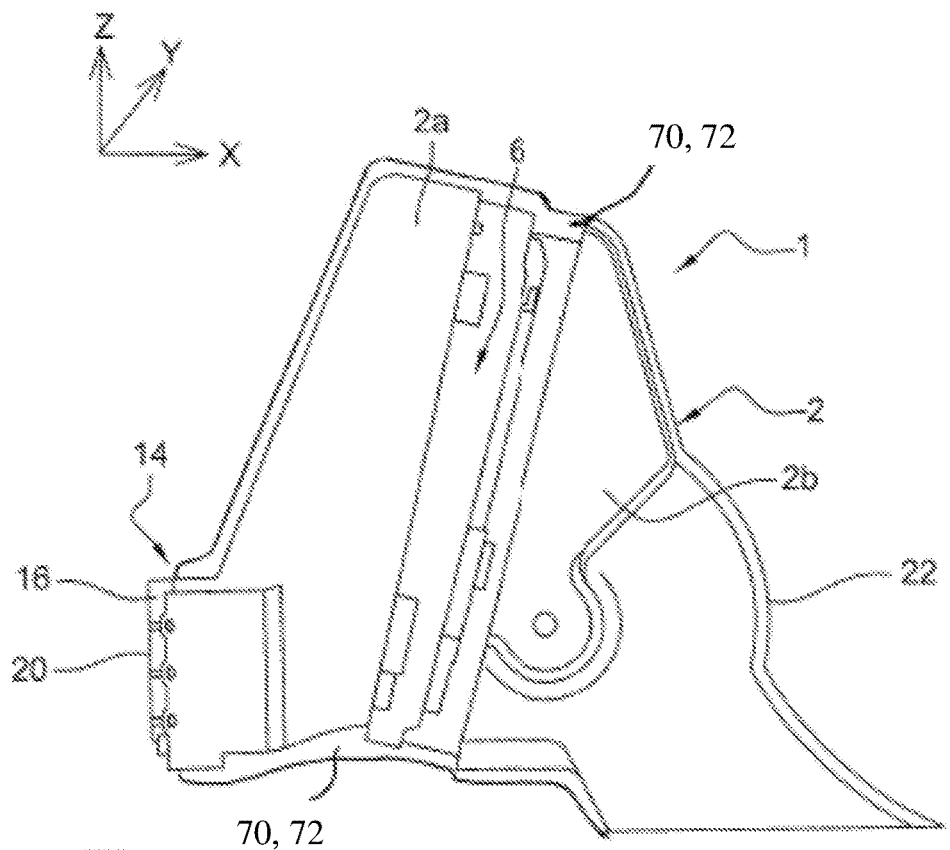
FIG. 1 shows a profile view of a device for regulating an air stream according to the invention.

FIG. 1 shows the device 1 for regulating an air stream for an air inlet of a motor vehicle according to the invention. The regulation device 1 extends in a longitudinal (X), transverse (Y) and vertical (Z) direction, for example relative to the axes of the vehicle, as shown by the axes in FIGS. 1, 2 and 4.

The device 1 for regulating an air stream according to the invention comprises a duct 2 corresponding to a shell, an air guide, or a housing, thus defining a flow channel 4 with an inlet 20 and an outlet 22 in which flows an air stream. The duct 2 is made from a flexible material in order to absorb the vibrations of the vehicle when it is traveling, and from a sufficiently strong material to hold elements such as heat exchangers; certain plastics, for example polypropylene or polyamide 6, lend themselves to such use.

According to the invention, one or more sound absorption means 70, in other words soundproofing means or sound insulating materials, can be arranged within the duct 2 thus suppressing or at least limiting the propagation of noise to the outside of the duct 2, and of the vehicle, when the regulation device 1 is mounted in the vehicle.

First sound absorption means 70 correspond to a sound absorbing coating 72 arranged on the walls of the duct 2 as shown in FIG. 5. The coating 72 can correspond to a layer of polyurethane foam that has open and/or closed pores and is preferably impregnated with a copolymer of vinylidene or to a layer of a woven or non-woven material such as felt, synthetic or natural wool consisting of different fibers or an insulating synthetic textile consisting of polyethylene terephthalate (PET) and/or other synthetic fibers. The synthetic wool can for example correspond to glass wool or rock wool. The coating 72 can be attached to the duct 2 either by thermoforming or by means of a cover or cap in which the coating 72 is arranged between the duct 2 and the cover.

Figure 5A:
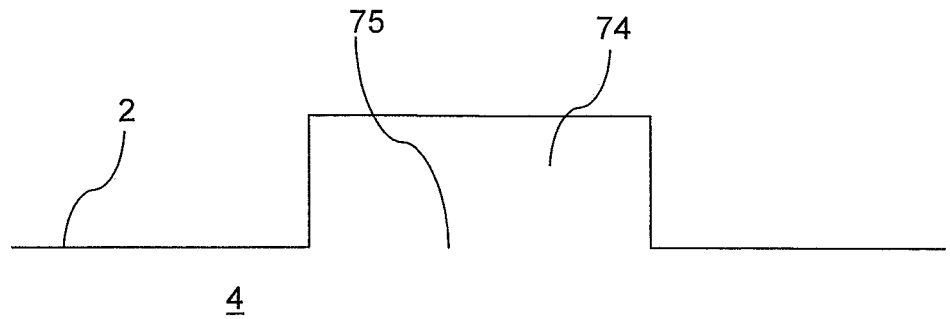
Figure 5B:
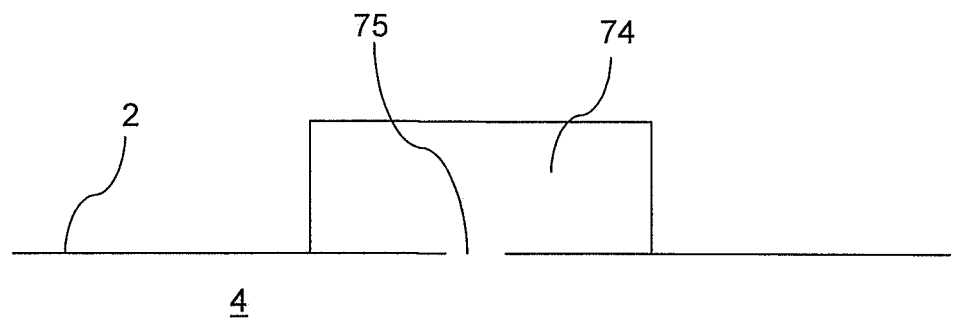
Figure 5C:
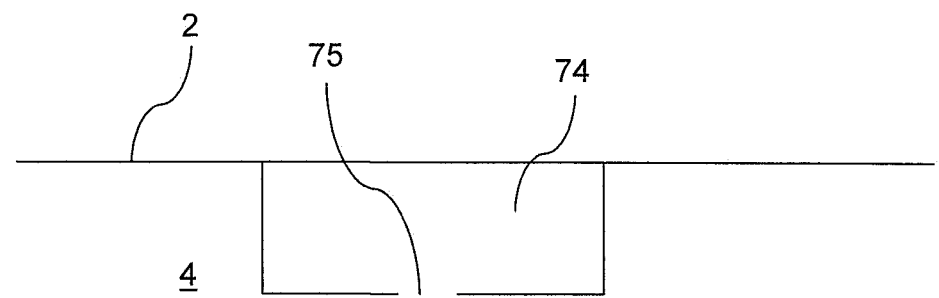
Figure 5D:
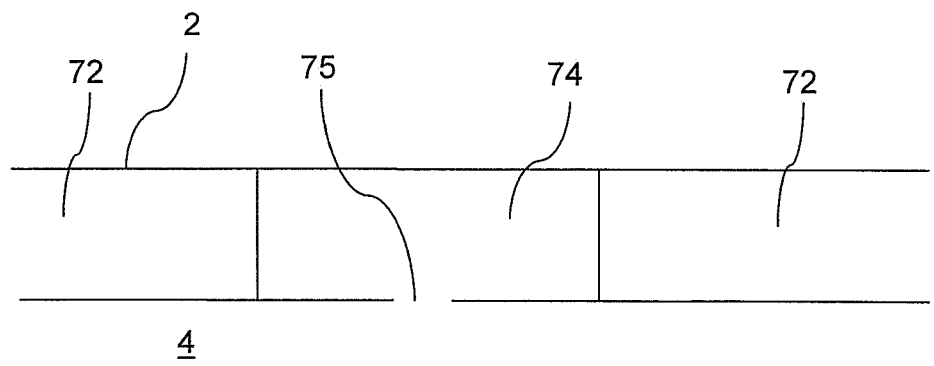

Second sound absorption means 70 correspond for example to one or more cavities 74 acting as a Helmholtz resonator. In other words the duct 2 comprises cavities 74 within its walls so as to form chambers in which the noise annoyance will be trapped and attenuated by rebounding on the different walls of the chamber. The Helmholtz resonators 74, in other words the chambers, can be arranged inside the duct 2 (FIG. 5c) or on the outer wall of the duct 2 (FIG. 5a, 5b), the inside of the chamber being connected to the duct 2 by an opening or a neck 75. FIG. 5d shows an embodiment in which a coating 72 is arranged on the wall of the duct 2, which further comprises a cavity 74.

Third sound absorption means 70 are formed by arranging obstacles 76 within the duct 2 in order to break the laminar flow of the air stream and avoid whistling phenomena. These obstacles correspond for example to walls with micro-perforations, or walls made from a sound absorbing material such as polyester or a hemp-based material. The obstacles 76 can also correspond to beams 77 extending over the width of the duct 2. The obstacles 76 can also be made from a soundproofing material such as polyurethane foam having open and/or closed pores and preferably impregnated with a copolymer of vinylidene. The obstacles 76 can alternatively be made from a woven or non-woven material such as felt, synthetic or natural wool consisting of different fibers or an insulating synthetic textile consisting of polyethylene terephthalate (PET) and/or other synthetic fibers, the synthetic wool corresponding for example to glass wool or rock wool.

Fourth sound absorption means 70 are formed by the fact that the duct 2 is made from a sound absorbing material, or from a material with micro-perforations, such as polyester, wool, for example rock or glass wool, or any other polymer having glass fibers or hemp fibers, the duct 2 being made from these materials by thermoforming.

Fifth sound absorption means 70 are formed by arranging an acoustic labyrinth 78 within the duct 2. The acoustic labyrinth 78 comprises an inlet 79 and an outlet 80 and can for example comprise a flap 86 arranged at the inlet 79 of the acoustic labyrinth 78 thus making it possible to orient the air stream to the acoustic labyrinth 78. The flap 86 allows or prevents the passage of the air stream through the acoustic labyrinth 78. The air stream rebounding on the walls is diverted on its path, which thus breaks the laminar flow of the air stream and reduces the noise annoyance. Obstacles 81 to the flow of the air stream can also be arranged within the acoustic labyrinth 78. The acoustic labyrinth 78 can be arranged within the duct 2.

Sixth sound absorption means 70 are formed by arranging an active noise control system with for example adaptive filtering to cancel the noise as for example with a loudspeaker or a vibrating enclosure. It is for example possible to arrange a sound detector 82 at the inlet of the duct 2 that detects the sound waves. This detector is coupled to an enclosure capable of emitting a wave in antiphase to the sound waves at the inlet of the duct so as to create interference and thus actively reduce the noise annoyance. It is also possible to couple the sound detector to a piezoelectric element 84 using the duct 2 as a vibrating enclosure emitting the wave in antiphase to the sound waves at the inlet of the duct 2. The sound detector 81 is connected to the piezoelectric element 84 or to the enclosure directly or via the electronic control unit (ECU) of the vehicle.

Of course, the invention is not limited to one embodiment and it is possible, according to the invention, to take each sound absorption means 70 individually or to combine different sound absorption means 70 in a regulation device 1, for example as shown in FIG. 5d. Of course, it is possible to combine several sound absorption means 70.

Figure 2:
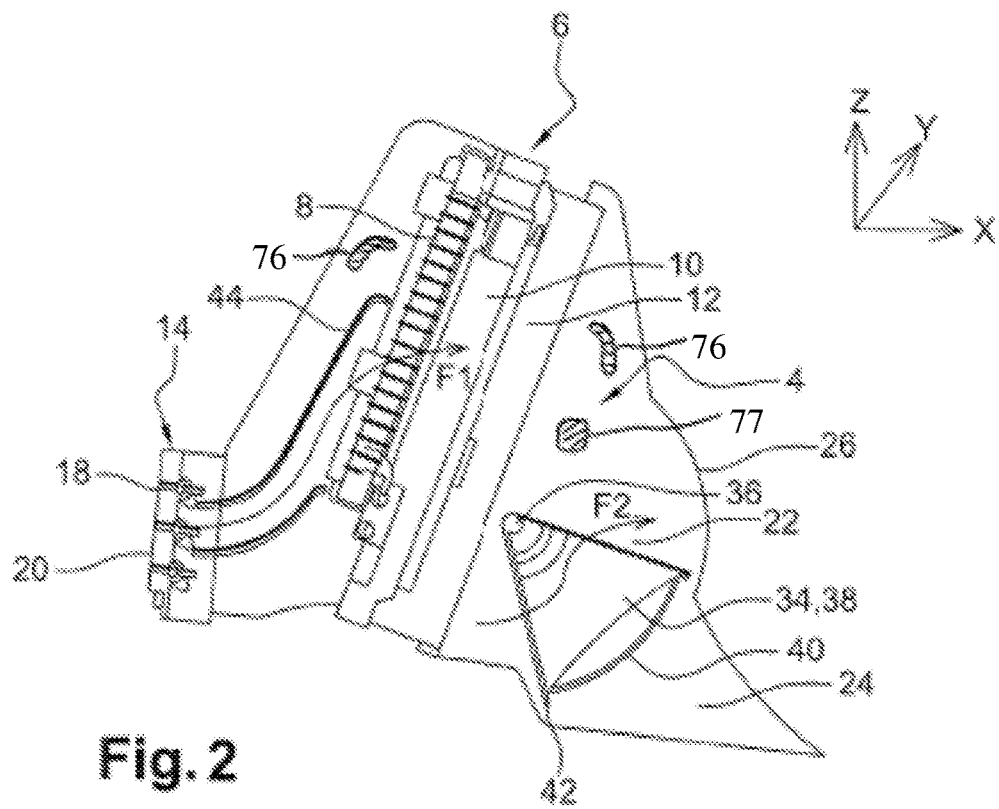
FIG. 2 shows a cross-sectional profile view of the device for regulating an air stream in FIG. 1.

The device 1 for regulating an air stream according to the invention further comprises a cooling unit 6. The cooling unit 6 comprises at least one heat exchanger suitable for allowing a heat exchange between the air stream and the fluid circulating within the heat exchanger. As shown in FIG. 2, the cooling unit 6 here comprises a first and a second heat exchanger 8, 10. The first heat exchanger 8 corresponds for example to a condenser, while the second heat exchanger 10 corresponds for example to a radiator. The cooling unit 6 further comprises a motor-fan unit 12 corresponding to a fan with blades and an associated motor so that it can take in and discharge an air stream through the regulation device 1, even when the vehicle is stationary.

The device 1 for regulating an air stream according to the invention further comprises a shut-off device 14 comprising a set of shut-off flaps 18 capable of pivoting rotatably so that they vary the flow rate of the air stream, said shut-off device 14 being arranged in the flow channel 4 upstream of the cooling unit 6 relative to the flow of the air stream. The shut-off device 14 further comprises a support frame 16 having bearings so as to hold the shut-off flaps 18.

Each shut-off flap 18 comprises an axis of rotation embodied by a journal that is inserted into the bearings of the support frame 16. The axes of rotation allow the shut-off flaps 18 to switch from an open configuration to a closed configuration. The open configuration, or in other words opening a shut-off flap 18, consists of placing (by rotation) the shut-off flaps 18 so that they provide as little opposition as possible to the passage of the air stream while orienting it appropriately. As shown in FIG. 2, in the open configuration, the shut-off flaps 18 are arranged in a horizontal position, in other words they extend in a longitudinal (X) and transverse (Y) direction, and thus ensure a maximum flow rate of the air stream, the air inlet 20 being clear. The closed configuration, or in other words closing a shut-off flap 18, consists of placing the shut-off flaps 18 so that they provide, by means of their front surface, as much opposition as possible to the flow of the air stream F, in conjunction with the other shut-off flaps 18. In this configuration, the shut-off flaps 18 are arranged in a vertical position, in other words they extend in a transverse (Y) and vertical (Z) direction, and thus ensure a minimum or even zero flow rate of the air stream, the air inlet 20 being shut off. Of course, the shut-off flaps 18 are capable of adopting any intermediate position between these two configurations.

The duct 2 as shown in FIG. 1 is made of two parts, a first part 2a connecting the inlet of the duct 2, and therefore the inlet 20 of the flow channel 4, in which the shut-off device 14 is arranged, to the cooling unit 6, and a second part 2b connecting the cooling unit 6 to the outlet of the duct 2 and therefore to the outlet 22 of the flow channel 4. The parts 2a, 2b of the duct comprise fastening means such as clips, screws, tapped holes, etc., with shapes that complement the fastening means arranged on the cooling unit 6. The parts 2a, 2b can also comprise fastening means with complementary shapes so that each part 2a, 2b can be fastened to the other. A single one-piece part 2 forming continuity of material between the inlet 20 and the outlet 22 of the flow channel 4 can also be envisaged.

According to the invention, the sound absorption means 70 are preferably arranged within the duct 2 in part 2b, in other words downstream of the cooling unit 6 relative to the flow of the air stream. Of course, it is possible to arrange the sound absorption means 70 upstream of the cooling unit 6. It is also possible to arrange the sound absorption means 70 upstream and downstream of the cooling unit 6.

Figure 3:
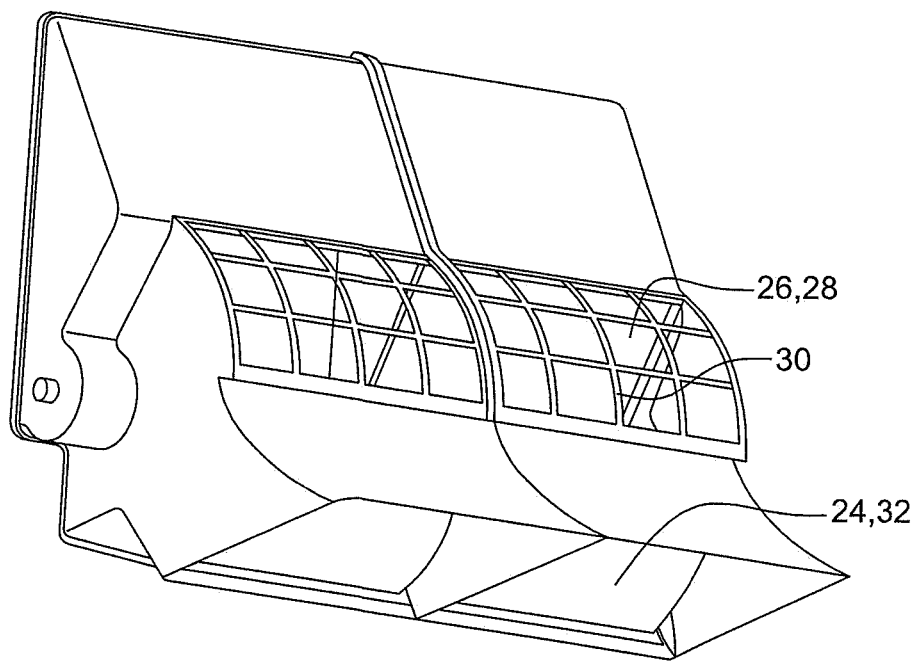
FIG. 3 shows a perspective view of part of the device for regulating an air stream, FIG. 4 schematically shows a profile view of a vehicle according to the invention, FIGS. 5a to 5d schematically show several embodiments of part of the device for regulating a stream.

The flow channel 4 comprises an inlet 20 and an outlet 22, the latter being made up of at least two separate ducts, the flap, which will be described below, being capable of shutting off each of said ducts. The outlet 22 of the flow channel 4 comprises a discharge duct 24 arranged to guide the air stream to the outside of the vehicle and a cooling duct 26 arranged to guide the air stream to the engine compartment of the vehicle. As shown in FIG. 3, the cooling duct 26 corresponds here to a channel in which an opening 28 provided with a grille 30 is made in a wall of the duct 2 thus allowing the air stream to flow from the flow channel 4 to the engine compartment. The discharge duct 24 corresponds here to a channel in which an opening 32 is made in a wall of the duct 2 thus allowing the air stream to flow from the flow channel 4 to the outside of the vehicle.

The device 1 for regulating an air stream according to the invention further comprises a flap 34 arranged within the flow channel 4 downstream of the cooling unit 6 relative to the flow of the air stream. The flap 34 is of the drum type as shown in FIG. 2 as, given that such a regulation device extends over a large part of the width of the vehicle (Y axis) and can thus reach more than one meter, the drum flap, due to its structure that offers improved mechanical strength, is better suited to such use. Other flaps can be envisaged, such as a sliding flap (also known as a sliding door) comprising a sliding door on which at least one rack is arranged and a toothed wheel that complements the rack, rotated about an axis by an actuator in order to move this flap, in particular in translation, according to an embodiment not shown.

The drum flap 34 comprises an axis of rotation 36 in the form of a shaft allowing the flap 34 to pivot. The drum flap 34 further comprises three solid walls. Two side walls 38 are arranged at the two opposite ends of the axis of rotation 36, these two side walls 38 being parallel and inscribed in a plane defined by the axes XZ perpendicular to the axis of rotation 36, and a transverse wall 40 connects the side walls together. The transverse wall 40 is inscribed in a plane defined by the axes XZ with a curved shape and allows the flow or stopping of the air stream in a duct 24, 26 at the outlet 22 of the flow channel 4 depending on the positioning thereof. The space between the side walls 38, the transverse wall 40 and the axis of rotation 36 is unoccupied so that the air stream is capable of passing between these elements as shown by the arrow F2 in FIG. 2.

The transverse wall 40 of the drum flap 34 is capable of shutting off the discharge duct 24 as shown in FIG. 2. The transverse wall 40 of the drum flap 34 is also capable of shutting off the cooling duct 26 according to an embodiment not shown.

The different walls of the flap 34 follow the shape of the walls of the duct 2 so as to provide proper sealing, and the flap 34 can also comprise elastomeric lips 42 overmolded onto the ends of the walls. The wall of the duct 2 in which the cooling duct 26 is arranged is thus substantially rounded, so that the curved transverse wall 40 of the flap 34 can fully shut off this outlet duct.

When the vehicle is traveling, the flap 34 is arranged so that it shuts off the cooling duct 26, the air stream therefore passing through the discharge duct 24. When the vehicle is parked at a terminal (as the battery is being charged), the flap 34 is arranged so that it shuts off the discharge duct 24 cooling duct 26, the air stream therefore passing through the cooling duct 26 as shown in FIG. 2. The flap 34 is capable of adopting any intermediate position.

Figure 6:
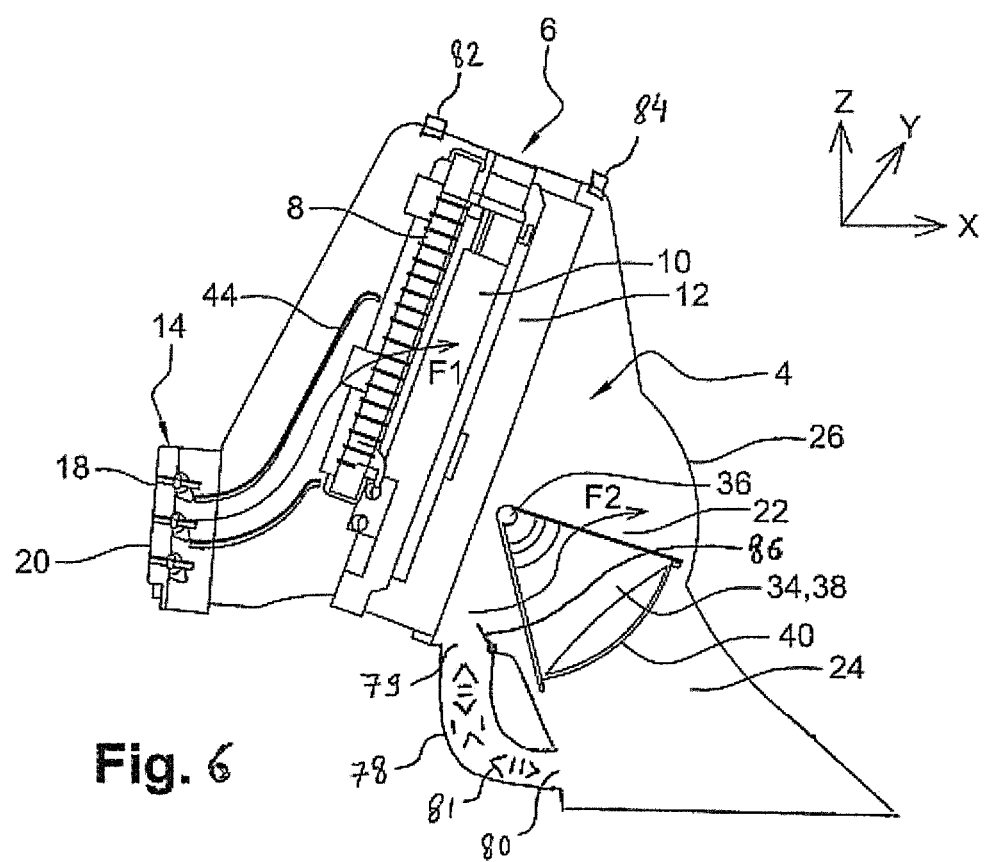
FIG. 6 shows a profile view of a device for regulating an air stream according to the invention.

According to the invention, the inlet 79 of the acoustic labyrinth 78 can for example be arranged downstream of the cooling unit 6 and upstream of the outlet 22 of the flow channel 4, and the outlet 80 of the acoustic labyrinth 78 arranged in the discharge duct 24 as shown in FIG. 6. Of course, it is also possible to arrange the outlet 80 of the acoustic labyrinth 78 in the cooling duct 26. It is also possible to arrange two acoustic labyrinths 78 each having an inlet 79 arranged downstream of the cooling unit 6 and upstream of the outlet 22 of the flow channel 4 and an outlet 80 in the discharge duct 24 and/or in the cooling duct 26. It is also possible to arrange the inlet 79 of the acoustic labyrinth 78 upstream of the cooling unit 6.

Still according to the invention, the cooling unit 6 is inclined relative to the shut-off device 14. In other words, the mid-planes of the cooling unit 6 and the shut-off device 14 form an angle other than 0° (non-zero), particularly an angle in an interval of 10° to 80°, more specifically in an interval of 30° to 60°. Such an arrangement makes it possible to reduce the spatial footprint of the regulation device 1.

Still according to the invention, it can be advantageous for the fins 44 to be arranged upstream and/or downstream of the cooling unit 6 relative to the flow of the air stream. The fins 44 correspond to air guides in the form of rounded walls defining corridors for the air stream in order to distribute the air stream F1 (FIG. 2) over the entire surface of the heat exchangers 8, 10 of the cooling unit 6, resulting in improved thermal efficiency.

In order to improve this thermal efficiency, it is beneficial for the fins 44 to extend from the shut-off device 14 to the cooling unit 6. The fins 44 can for example extend the continuity of the shut-off flaps 18 of the shut-off device 14 when they are in the open configuration. The fins 44 can also be generally S-shaped with a leading edge corresponding to one end of the fin extending in a horizontal plane defined by the X and Y axes, a trailing edge substantially parallel to the leading edge but at a different height (Z) and an inclined section or ramp connecting the leading edge and the trailing edge that extends mainly along a vertical axis (Z). The invention is not limited to the shape of the fins 44 provided that they act as a guide for the air stream; the fins 44 can for example be in the shape of a quarter of a circle.

The first flat end part of the fin 44 suitable for being passed through by the air stream F1 corresponds to the leading edge and is flat. The second and last flat end part suitable for being passed through by the air stream F1 corresponds to the trailing edge and is also flat. The inclined section is not part of the leading and trailing edges.

The fins 44 extend between the shut-off device 14 and the cooling unit 6 without however being in contact with these elements. In order to better guide the air, the leading and trailing edges of the fins 44 are arranged close to the shut-off device 14 and the cooling unit 6 respectively, without however abutting against these elements.

Still according to the invention, the flow area of the flow channel 4 widens from the inlet 20 of the flow channel 4 to the cooling unit 6 and narrows from the cooling unit 6 to the outlet 22 of the flow channel 4 in the direction of flow of the air stream. In other words, the flow area of the flow channel 4 has at least one dimension (width and/or height) that increases further along the length thereof, or the closer it is to the cooling unit 6 starting from the inlet 20, in the direction of flow of the air stream. Similarly, the flow area of the flow channel 4 has at least one dimension (width and/or height) that decreases further along the length thereof, or the further away it is from the cooling unit 6 going towards the outlet 22, in the direction of flow of the air stream.

Figure 4:
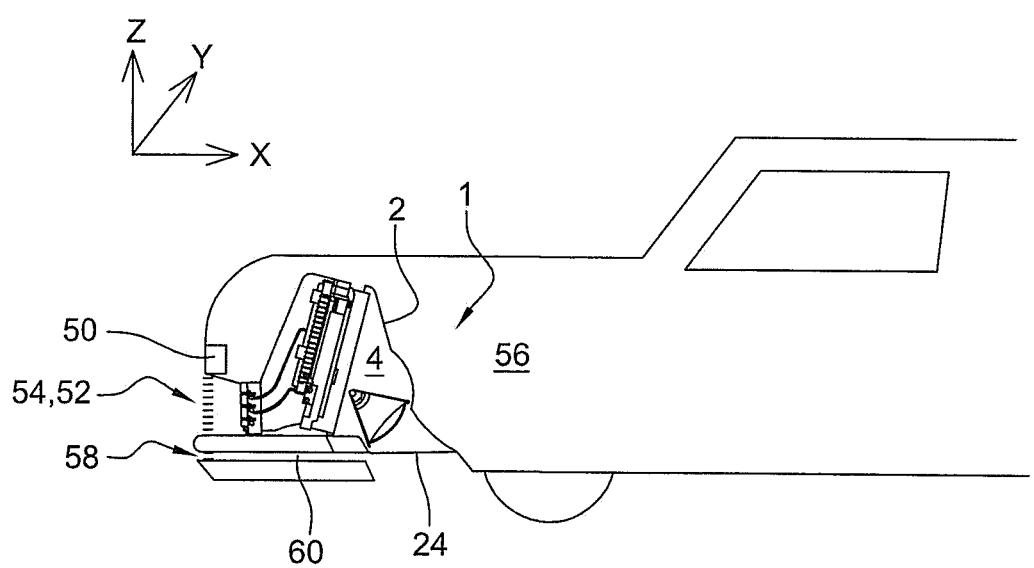

FIG. 4 shows a vertical cross-section of a motor vehicle along a longitudinal direction of the vehicle. The vehicle comprises a bumper beam 50 below which is placed a grille 52. This grille 52 is fixed and remains in the open position to allow an incoming air stream to pass through. The vehicle according to the invention comprises an air inlet regulation device 1 as described above.

The motor vehicle according to the invention therefore comprises an air inlet 54 provided with a grille 52 and a device 1 for regulating this air inlet. The outlet 22 of the flow channel 4 comprises a discharge duct 24 arranged to convey the air stream to the outside of the vehicle and a cooling duct 26 arranged to convey the air stream to the engine compartment 56 of the vehicle.

The vehicle according to the invention further comprises an additional inlet 58 as well as an additional duct 60 connecting said additional inlet 58 to the discharge duct 24 conveying the air stream to the outside of the vehicle. This makes it possible to accentuate the Venturi effect of the discharge duct 24, thus increasing the air flow rate circulating, thus improving the thermal efficiency. The additional inlet 58 can also be provided with a grille in order to prevent foreign bodies (branches, leaves, etc.) from entering the additional duct 60.

It must be understood however that these embodiments are given by way of illustration of the subject matter of the invention. The invention is not limited to these embodiments described above and supplied by way of example only. It encompasses various modifications, alternative forms and other variants that a person skilled in the art can envisage within the scope of the present invention, and in particular any combination of the different embodiments described above.

The invention claimed is:

1. A regulation device for regulating an air stream for an air inlet of a motor vehicle, comprising:
    a duct defining a flow channel for a flow of the air stream,
    wherein a cooling unit is arranged in the duct, the cooling unit comprising at least one heat exchanger and a motor-fan unit,
    wherein at least one sound absorption means arranged within the duct, wherein the at least one sound absorption means is configured to at least partially limit a propagation of noise annoyance to an outside of the duct, and
    wherein the duct comprises one or more cavities acting as a Helmholtz resonator.

2. The regulation device as claimed in claim 1, wherein the sound absorption means are arranged downstream of the cooling unit relative to the flow of the air stream.

3. The regulation device as claimed in claim 1, wherein the sound absorption means comprise a coating made from a woven or non-woven material having consisting of different fibers or a foam.

4. The regulation device as claimed in claim 1, wherein obstacles to the flow of the air stream are arranged within the duct.

5. The regulation device as claimed in claim 4, wherein the obstacles comprise walls with micro-perforations, or walls made from a soundproofing material such as polyester, or beams extending over the width of the duct.

6. The regulation device as claimed in claim 1, wherein the duct is made from a sound absorbing material such as polyester, rock wool or any other polymer having glass fibers or hemp fibers.

7. The regulation device as claimed in claim 1, wherein an acoustic labyrinth is arranged within the duct.

8. The regulation device as claimed in claim 1, wherein the sound absorption means are an active noise control system.

9. A motor vehicle comprising:
    an air inlet; and
    a regulation device for the air inlet, the regulation device comprising:
        a duct defining a flow channel for a flow of an air stream,
        wherein a cooling unit is arranged in the duct, the cooling unit comprising at least one heat exchanger and a motor-fan unit,
        wherein at least one sound absorption means arranged within the duct, wherein the at least one sound absorption means is configured to so at least partially limit a propagation of noise annoyance to an outside of the duct, and
        wherein the duct comprises one or more cavities acting as a Helmholtz resonator.

10. A electric vehicle, comprising:
a battery for charging the electric vehicle;
an air inlet; and
a regulation device for the air inlet, the regulation device comprising:
  a duct defining a flow channel for a flow of an air stream,
  wherein a cooling unit is arranged in the duct, the cooling unit comprising at least one heat exchanger and a motor-fan unit,
  wherein the motor-fan unit is activated to cool the battery when charging the electric vehicle,
  wherein at least one sound absorption means arranged within the duct, wherein the at least one sound absorption means is configured to at least partially limit a propagation of noise annoyance from the activated motor-fan unit to an outside of the duct, and
  wherein the duct comprises one or more cavities acting as a Helmholtz resonator.

* * * * *